Oct. 14, 1924. 1,511,833

R. JARDINE

COMPOSITE POPPET VALVE AND PROCESS OF MAKING THE SAME

Filed Sept. 13, 1922

Inventor:
Robert Jardine
By Gillson & Gillson
Attys.

Patented Oct. 14, 1924.

1,511,833

UNITED STATES PATENT OFFICE.

ROBERT JARDINE, OF CHICAGO, ILLINOIS, ASSIGNOR TO RICH TOOL COMPANY, OF CHICAGO, ILLINOIS, A CORPORATION OF ILLINOIS.

COMPOSITE POPPET VALVE AND PROCESS OF MAKING THE SAME.

Application filed September 13, 1922. Serial No. 587,994.

*To all whom it may concern:*

Be it known that I, ROBERT JARDINE, a citizen of the United States, and resident of Chicago, county of Cook, and State of Illinois, have invented certain new and useful Improvements in Composite Poppet Valves and Processes of Making the Same, of which the following is a specification, and which are illustrated in the accompanying drawings, forming a part thereof.

The invention relates to poppet valves for gas engines, and especially to those wherein different materials are employed for different parts of the valve. The invention is not, however, concerned with the particular character of the materials employed, but rather with the form in which they are provided and the manner in which they are associated. Nevertheless, in practicing the invention the materials employed for the different parts of the valve may, and preferably will, be as specified in one or the other of my pending applications for patent on gas engine valves, filed August 8, 1821, Serial Numbers 490,521 and 490,522.

The object of the invention is to provide an improved composite valve and method of manufacturing the same, wherein the material employed for the rim or seating portion of the valve is used in a form which is readily obtainable without waste, easily applied, and firmly incorporated with the remainder of the valve.

Figure 1:
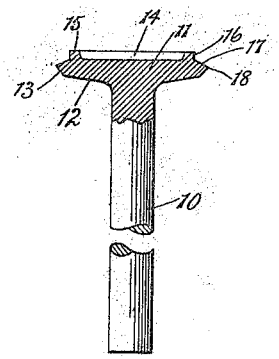
Fig. 1 is a side elevation, partly in section, and Fig. 2 a central sectional view, showing the two parts from which the improved valve may be produced, the said parts being in the form which they preferably take when prepared for assembly.

The valve stem 10 and the central or body portion 11 of the head may be produced, in the form illustrated in Fig. 1, in any convenient manner, as by forming the said two parts in one piece from an integral stem rod, by upsetting the head portion upon the end of the stem in a suitable forging press (not shown). When so formed the head portion 11 will be produced between the dies of the forging press and may take any desired shape. As illustrated the head portion 11 has a sloping under surface 12, a beveled edge 13, and a cupped or dished upper surface 14, the annular ridge or rib 15 forming the wall of the cup. Preferably the rib 15 has an abrupt or steep outer surface providing an outwardly facing annular shoulder 16, and this shoulder is in turn surrounded by a sloping rim 17 which extends to and joins the beveled edge 13 at a sharp angle or corner 18.

Figure 2:
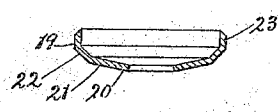

The part 19 (Fig. 2), employed to provide the rim or seating portion of the completed valve, is preferably a stamping produced from the selected material in sheet form. As shown, this part has a central aperture 20, designed to receive the valve stem 10, an inner sloping portion 21, and an intermediate sloping portion 22, the two last-mentioned parts being shaped to conform, respectively, with the sloping under side 12 of the valve head portion 11 and with its beveled edge 13. The part 19 also has an upstanding flange 23.

Figure 3:
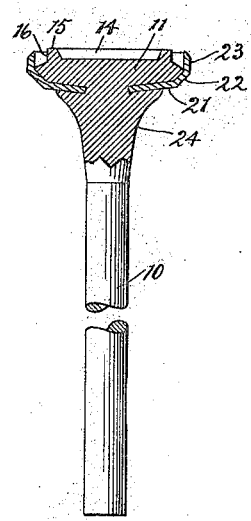
Fig. 3 is similar to Fig. 1 but shows the parts of the valve assembled and in the form which they may take after the first operation in connecting them.

When the part 19 has been threaded upon the stem 10, with its said inner and intermediate portions engaged with the under side and beveled edge of the head portion 11, and its flange 23 extending upwardly about the rim 17, that part of the stem just under the head is heated and upset by endwise pressure to produce the enlargement of the stem shown at 24 (Fig. 3). The sloping inner portion 21 of the sheet metal part 19 is thus firmly pinched or gripped between the said enlargement and the sloping underside 12 of the head portion 11.

Figure 4:
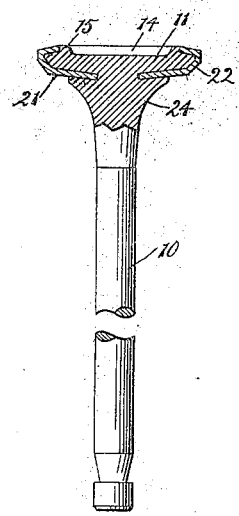
Fig. 4 is a similar view of the completed valve.

In the next operation the upstanding flange 23 of the sheet metal part 19 is folded inwardly upon the sloping rim 17 of the head portion 11. At the same time, or immediately thereafter, and while the inwardly folded flange 23 is held in a die (not shown), the cupped face 14 of the head is flattened, pressing the rib 15 obliquely outward and downward and forcing the outwardly facing shoulder 16 into intimate contact with the edge of the flange 23 and giving said shoulder an undercut form. The valve now has the form illustrated in Fig. 4, the edge of the flange 23 being preferably chamfered, and the rib 15 sloping outwardly over the said chamfered edge of the flange, whereby the flange is firmly held in place, and in the completed article, the part 19 is in the form of a channel.

It will thus be seen that a composite valve produced in accordance with the invention has its parts permanently connected and so associated that their separation in service is impossible. Likewise the sheet metal part 19 is so positioned in the finished valve that the formation of this part from a hard non-corrosive alloy steel produces a valve of great durability, without the use of expensive material in other portions. Furthermore, so little material is required for the said sheet metal part that the use of any desired alloy therein will not greatly increase the cost of the valve in any case.

I claim as my invention—

1. A composite poppet valve comprising, in combination, an integrally formed head and stem with an enlargement upset on the stem under the head, and a rim having an instanding flange extending under the head and firmly gripped between the underside of the head and the said enlargement on the stem.

2. The combination with the head and stem of a poppet valve, of a continuous rim for the valve head in the form of a channel having its flanges extending inwardly over and under the margin of the valve head.

3. A composite poppet valve comprising, in combination, an integrally formed head and stem with an enlargement on the stem under the head, and a rim having instanding flanges extending over and under the head, the flange extending under the head being firmly gripped between the underside of the head and the said enlargement on the stem.

4. A composite poppet valve comprising, in combination, an integrally formed head and stem with an enlargement on the stem under the head and an outwardly facing annular shoulder on the face of the head near the periphery thereof, and a rim having instanding flanges one extending over the margin of the head and abutting the said outwardly facing shoulder thereon and the other extending under the head and being firmly gripped between the underside of the head and the said enlargement on the stem.

5. The method of making a composite poppet valve which consists in assembling a centrally apertured cup with an integrally formed stem and head portion by threading the cup upon the stem to receive the head portion within the cup, and then upsetting the stem under the head to produce an enlargement thereon between which and the underside of the head portion the bottom of the cup is firmly gripped.

6. The method of making a composite poppet valve which consists in assembling an integrally formed head body and stem with a centrally apertured cup which is deeper than the thickness of the head body at its rim, by threading the cup upon the stem to receive the head body within the cup, upsetting the stem under the head to produce an enlargement thereon between which and the underside of the head body the bottom of the cup is firmly gripped, and folding the rim of the cup inwardly over the margin of the head body.

7. The method of making a composite poppet valve which consists in assembling an integrally formed head body and stem with a centrally apertured cup which is deeper than the thickness of the head body at its rim, by threading the cup upon the stem to receive the head body within the cup and folding the rim of the cup inwardly over the margin of the head body.

8. A composite poppet valve comprising, in combination, an integrally formed head and stem with an enlargement on the stem under the head and an outwardly facing undercut annular shoulder on the face of the head near the periphery thereof, and a sheet metal rim having instanding flanges one having a chamfered edge and extending over the margin of the head with its chamfered edge interlocked with the said outwardly facing undercut shoulder on the face of the head and the other extending under the head and being firmly gripped between the underside of the head and the said enlargement on the stem.

ROBERT JARDINE.